United States Patent
Wang

(10) Patent No.: US 10,439,668 B2
(45) Date of Patent: *Oct. 8, 2019

(54) PROTECTIVE CASE ASSEMBLY FOR HANDHELD DEVICE

(71) Applicant: EVOLUTIVE LABS CO., LTD., Taichung (TW)

(72) Inventor: Ching-Fu Wang, Taichung (TW)

(73) Assignee: Evolutive Labs Co., Ltd., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/233,969

(22) Filed: Dec. 27, 2018

(65) Prior Publication Data
US 2019/0132020 A1    May 2, 2019

Related U.S. Application Data

(63) Continuation of application No. 15/910,056, filed on Mar. 2, 2018.

(30) Foreign Application Priority Data

Aug. 23, 2017  (TW) .............................. 106128630 A

(51) Int. Cl.
*H04M 1/00*  (2006.01)
*H04B 1/3888*  (2015.01)
(Continued)

(52) U.S. Cl.
CPC ........ *H04B 1/3888* (2013.01); *H04M 1/0202* (2013.01); *H04M 1/185* (2013.01)

(58) Field of Classification Search
CPC ..... H04B 1/3833; H04B 1/3888; H04M 1/04; H04M 1/0202; H04M 1/0252; H04M 1/185
(Continued)

(56) References Cited

U.S. PATENT DOCUMENTS 8,254,138 B2 *  8/2012  Ouyang .................. H04M 1/18
                                                   361/730
8,430,240 B2 *  4/2013  Kim ....................... A45C 11/00
                                                   455/575.8
(Continued)

FOREIGN PATENT DOCUMENTS

TW         M451787 U1    4/2013

OTHER PUBLICATIONS

Search Report appended to an Office Action, which was issued to Taiwanese counterpart application No. 106128630 by the TIPO dated Feb. 22, 2018 (2 pages, English translation included).

*Primary Examiner* — Quochien B Vuong
(74) *Attorney, Agent, or Firm* — Michael Best & Friedrich LLP

(57) ABSTRACT

A protective case assembly for a handheld device includes a casing body and a frame. The handheld device has a device front surface, a device back surface opposite to the device front surface, and a device peripheral surface connected between the device front surface and the device back surface. The casing body is configured to surround the device peripheral surface. The frame is detachably connected to the casing body and has a frame inner peripheral surface defining a central hollow portion for exposure of the device back surface.

10 Claims, 18 Drawing Sheets

(51) Int. Cl.
*H04M 1/02* (2006.01)
*H04M 1/18* (2006.01)

(58) Field of Classification Search
USPC .................................. 455/90.3, 575.1, 575.8
See application file for complete search history.

(56) References Cited

U.S. PATENT DOCUMENTS

| | | | |
|---|---|---|---|
| 8,889,985 B2 | 11/2014 | Shi et al. | |
| 9,590,684 B2 | 3/2017 | Poon et al. | |
| 9,831,905 B1* | 11/2017 | Flores | H04B 1/3888 |
| 9,935,669 B1 | 4/2018 | Kuo | |
| 2015/0172431 A1* | 6/2015 | Huang | H04B 1/3888 |
| | | | 455/575.8 |

* cited by examiner

US 10,439,668 B2

PROTECTIVE CASE ASSEMBLY FOR HANDHELD DEVICE

CROSS-REFERENCE TO RELATED APPLICATION

This application is a continuation application of U.S. patent application Ser. No. 15/910,056, filed on Mar. 2, 2018, which claims priority to Taiwanese Patent Application No. 106128630, filed on Aug. 23, 2017.

FIELD

The disclosure relates to a protective case assembly, more particularly to a protective case assembly for a handheld device having a detachable component.

BACKGROUND

In today's era of handheld devices, in order to attract the attention of consumers, the design of today's mobile phone has become diversified and personalized. Especially, the design at the back of the mobile phone, apart from an eye-catching logo, usually consumers are allowed to add in the blank space any variety of decorations to suit his/her personal preference, such as 3D stickers, etc.

Referring to FIG. 1, a conventional protective case assembly includes a casing body 1 for covering a mobile phone (not shown), and a back plate 2 detachably connected to the casing body 1. However, the back plate 2 blocks the original or personal special design at the back of the mobile phone. Thus, in order to protect the mobile phone, the special design at the back of the mobile phone must be sacrificed. Further, the back plate 2 may also hinder the heat dissipation and wireless charging of the mobile phone. Hence, a user must detach the back plate 2 from the casing body 1 to expose the design at the back of the mobile phone, to increase wireless charging efficiency, and to accelerate the heat dissipating rate of the mobile phone. However, this will result in the exposure of the engaging structure of the casing body 1 and the back plate 2, so that not only the overall outer appearance of the mobile phone is affected, dirt will also be easily accumulated in the mobile phone.

SUMMARY

Therefore, an object of the present disclosure is to provide a protective case assembly for a handheld device that is capable of overcoming the aforesaid drawbacks of the prior art.

According to one aspect of this disclosure, a protective case assembly for a handheld device includes a casing body and a frame. The handheld device has a device front surface, a device back surface opposite to the device front surface, and a device peripheral surface connected between the device front surface and the device back surface. The casing body is configured to surround the device peripheral surface. The frame is detachably connected to the casing body and has a frame inner peripheral surface that defines a central hollow portion for exposure of the device back surface.

Another object of this disclosure is to provide a frame that is detachably connected to a casing body of a protective case assembly so as to completely expose the back of a handheld device and that can enhance the overall appearance of the protective case assembly.

According to another aspect of this disclosure, a frame is configured to be detachably connected to a casing body of a protective case assembly which surrounds a device peripheral surface of a handheld device. The frame comprises a frame body having a frame inner peripheral surface defining a central hollow portion, a frame outer peripheral surface opposite to the frame inner peripheral surface, a frame rear peripheral edge surface interconnecting rear edges of the frame inner peripheral surface and the frame outer peripheral surface, a frame front peripheral edge surface interconnecting front edges of the frame inner peripheral surface and the frame outer peripheral surface and opposite to the frame rear peripheral edge surface, two spaced-apart frame short sides, and two spaced-apart frame long sides connected between the frame short sides.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
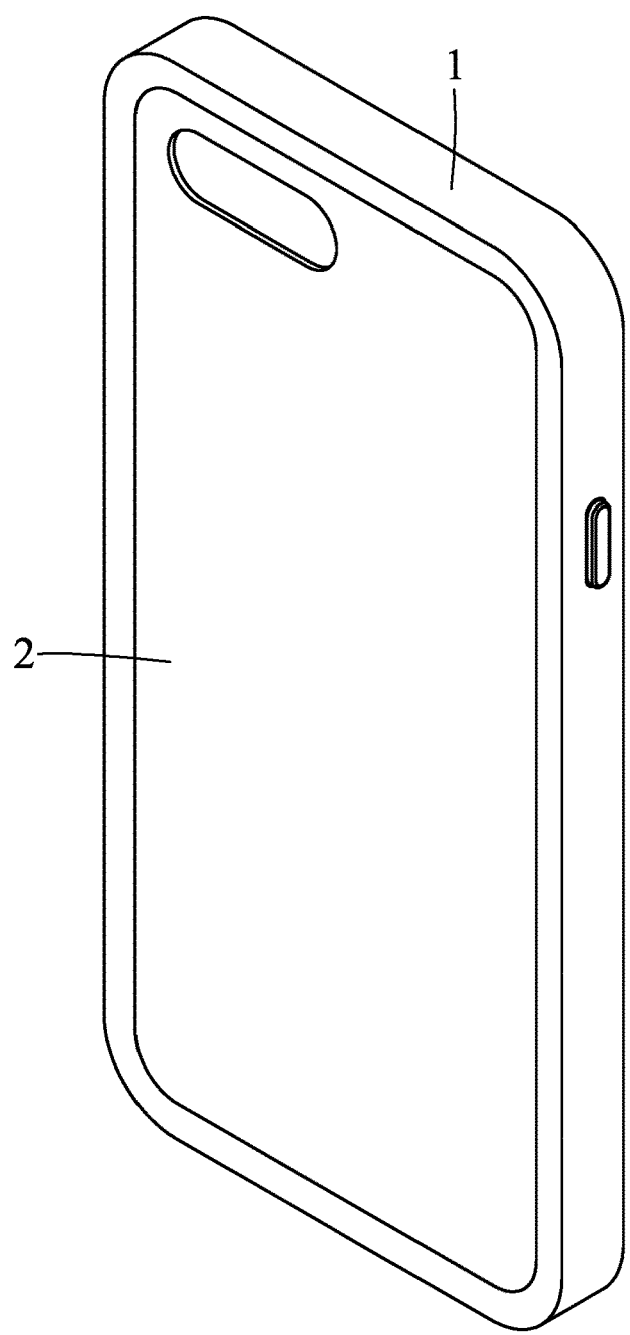
FIG. 1 is a perspective view of a conventional protective case assembly.

Before the present disclosure is described in greater detail with reference to the accompanying embodiments, it should be noted herein that like elements are denoted by the same reference numerals throughout the disclosure.

Referring to FIGS. 2 to 7, a protective case assembly according to the first embodiment of the present disclosure comprises a casing body 3, a frame 4, and a coupling unit 5 and an engaging unit 6 for detachably coupling and engaging the frame 4 to the casing body 3. In other variations of this embodiment, the protective case assembly may comprise the casing body 3, the frame 4, and the coupling unit 5 or the engaging unit 6.

The protective case assembly of this disclosure is used for covering and protecting a handheld device 9 which has a device front surface 91, a device back surface 92 opposite to the device front side 91, and a device peripheral surface 93 connected between the device front surface 91 and the device back surface 92.

The casing body 3 surrounds the device peripheral surface 93, and has two spaced-apart casing body short sides 31 extending in a left-right direction, two spaced-apart casing body long sides 32 connected between the casing body short sides 31 and extending in a top-bottom direction, a casing body outer peripheral surface 33, a casing body inner peripheral surface 34 opposite to the casing body outer peripheral surface 33 and abutting against the device peripheral surface 93, a casing body rear peripheral edge surface 35 interconnecting rear edges of the casing body outer and inner peripheral surfaces 33, 34 and proximate to the device back surface 92, and a casing body front peripheral edge surface 36 interconnecting front edges of the casing body outer and inner peripheral surfaces 33, 34 and opposite to the casing body rear peripheral edge surface 35. The casing body 3 has a receiving space 37 defined by the casing body inner peripheral surface 34 and capable of releasably securing the handheld device 9.

The frame 4 has a frame body 40 that is annular, that is detachably connected to the casing body 3, and that is proximate to the device back surface 92. The frame body 40 has a frame inner peripheral surface 41 defining a central hollow portion 42 for exposure of the device back surface 92, a frame outer peripheral surface 47 opposite to the frame inner peripheral surface 41, two spaced-apart frame short sides 43 corresponding to the casing body short sides 31, two spaced-apart frame long sides 44 connected between the frame short sides 43 and corresponding to the casing body long sides 32, a frame rear peripheral edge surface 45 interconnecting rear edges of the frame inner and outer peripheral surfaces 41, 47, and a frame front peripheral edge surface 46 that interconnects front edges of the frame inner and outer peripheral surfaces 41, 47, that is opposite to the frame rear peripheral edge surface 45 and that abuts against the device peripheral surface 93. The frame outer peripheral surface 47 has a first outer peripheral surface portion 471 connected to the frame rear peripheral edge surface 45, and a second outer peripheral surface portion 472 connected to the frame front peripheral edge surface 46 and the first outer peripheral surface portion 471.

Figure 2:
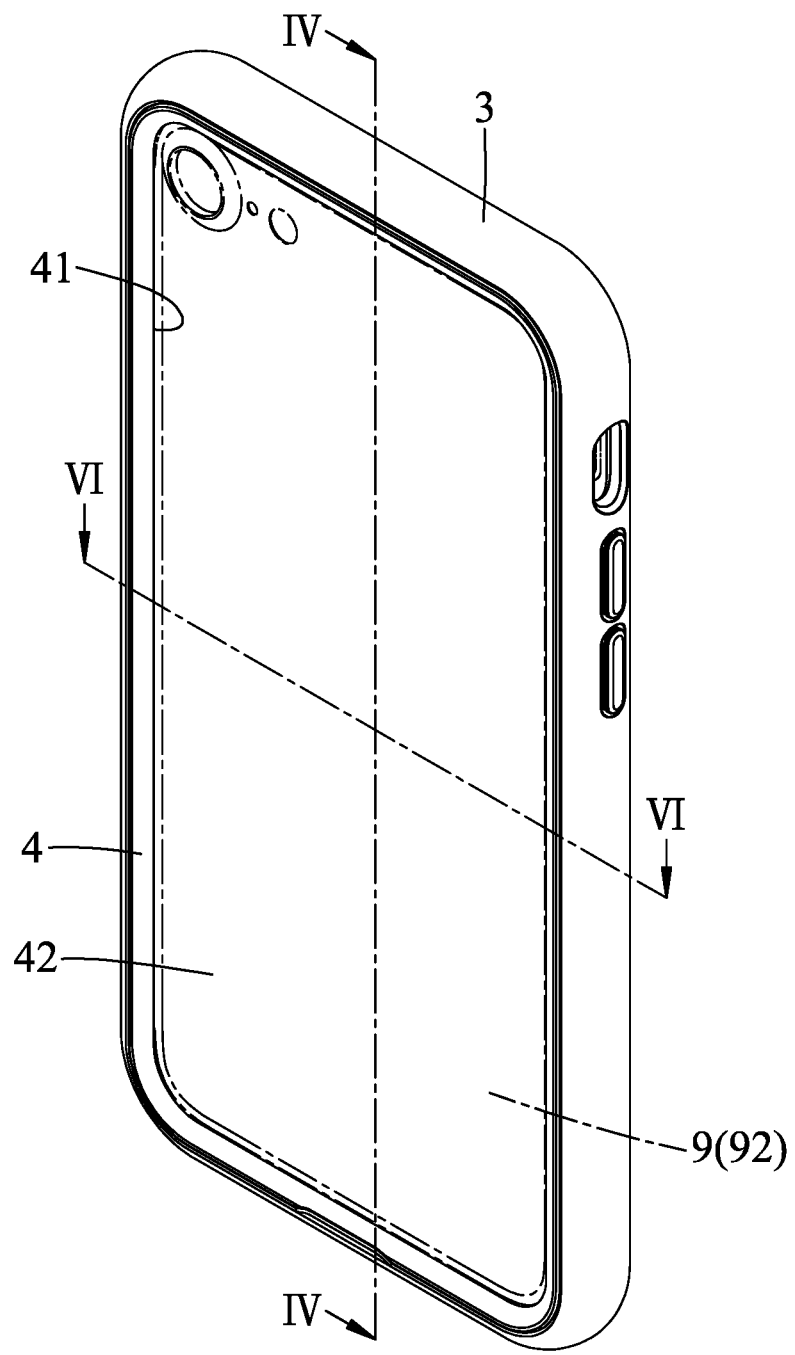
FIG. 2 is a perspective view of a protective case assembly according to the first embodiment of this disclosure.
Figure 3:
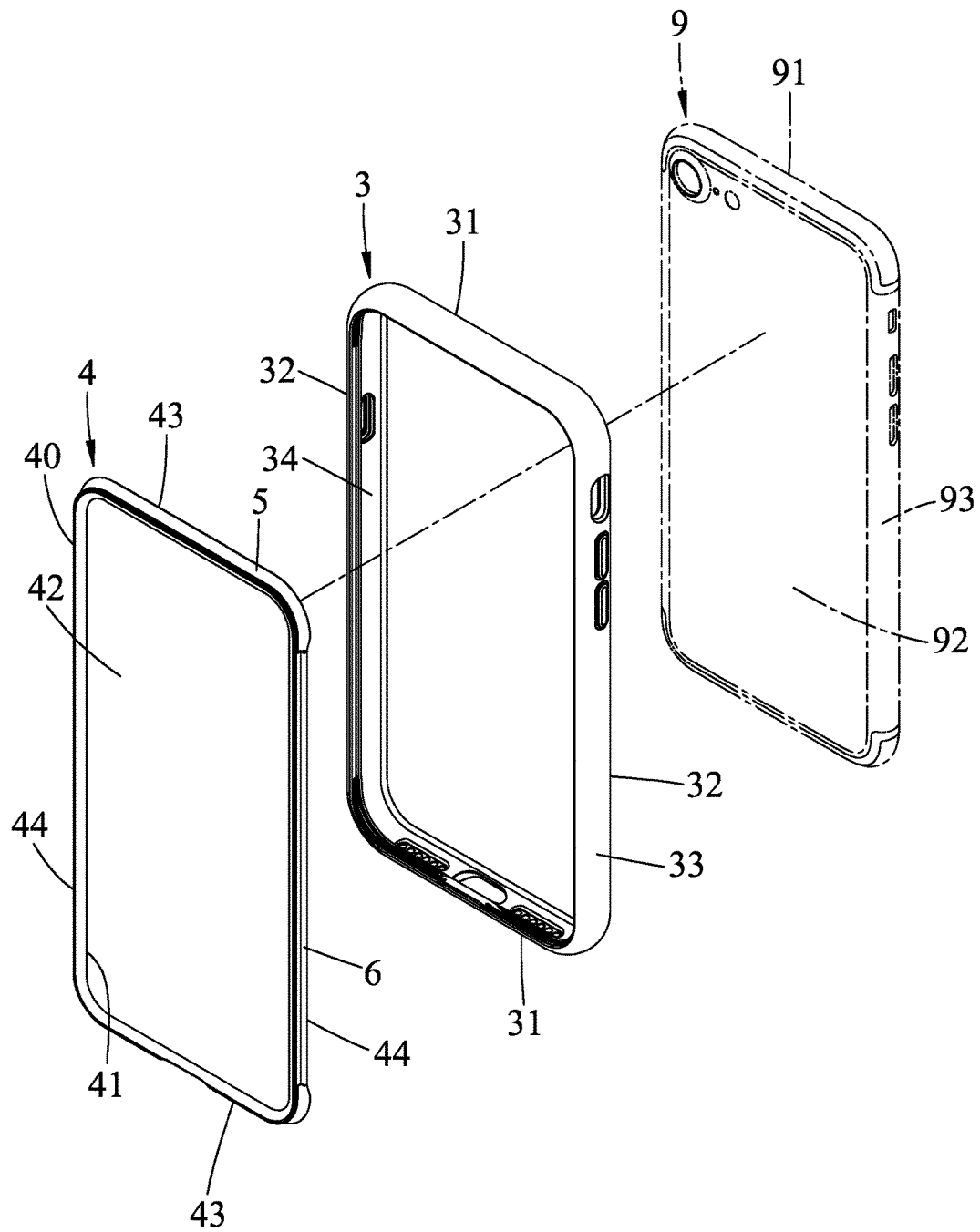
FIG. 3 is an exploded perspective view of the first embodiment.
Figure 4:
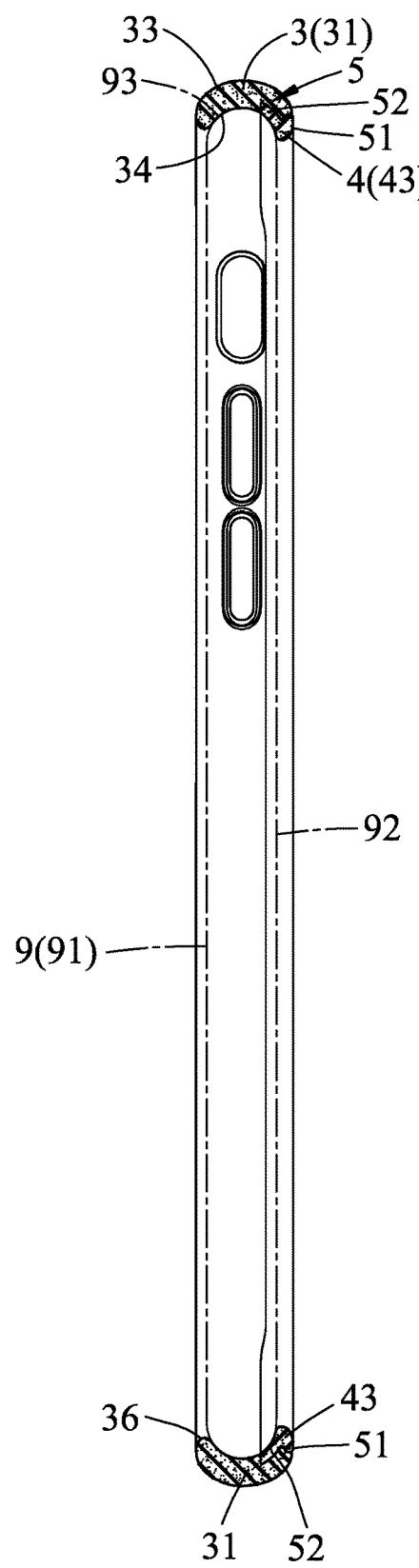
FIG. 4 is a sectional view taken along line IV-IV of FIG. 2.
Figure 5:
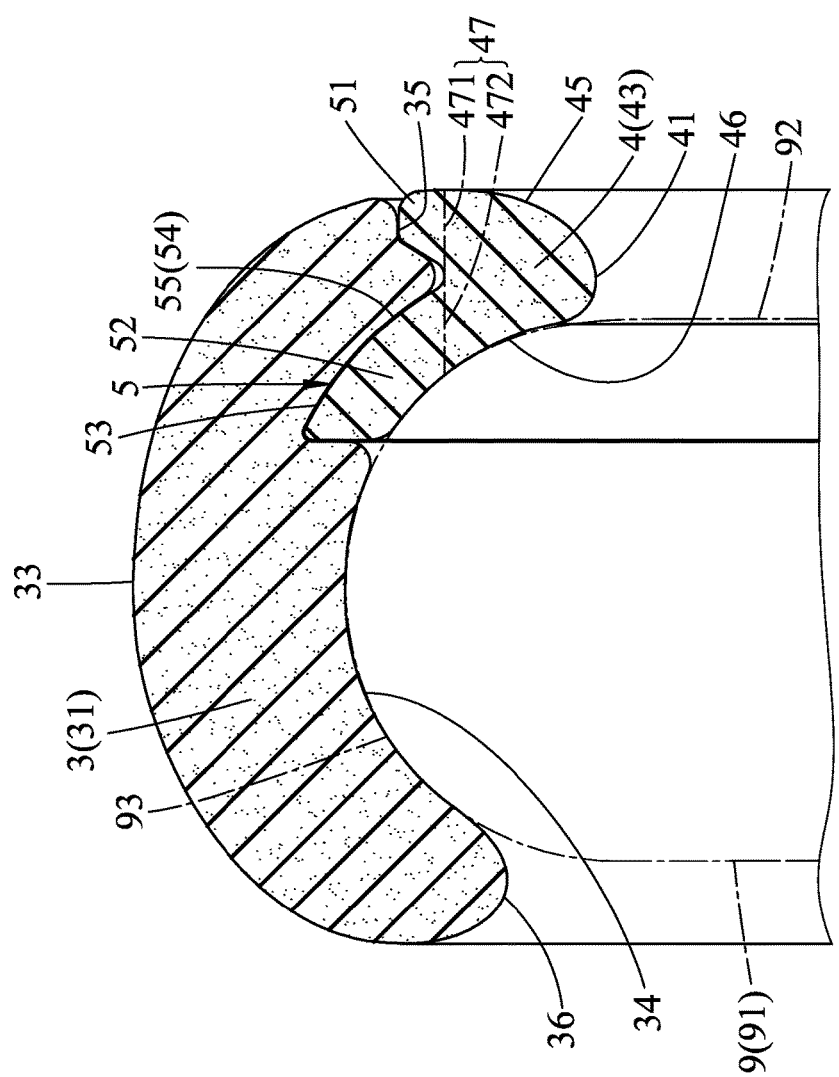
FIG. 5 is an enlarged fragmentary sectional view of FIG. 4.

With reference to FIGS. 2, 4 and 5, the coupling unit 5 includes two first protrusions 51, two second protrusions 52 and two main grooves 53. The first protrusions 51 are disposed on the frame short sides 43. Each first protrusion 51 extends outwardly from the first outer peripheral surface portion 471 of the frame outer peripheral surface 47 toward the casing body 3, and has a length extending in the left-right direction. The second protrusions 52 are also disposed on the frame short sides 43. Each second protrusion 52 extends outwardly from the second outer peripheral surface portion 472 of the frame outer peripheral surface 47 toward the casing body 3, and also has a length extending in the left-right direction. Each first protrusion 51 cooperates with a respective one of the second protrusions 52 to define therebetween an engaging groove 54.

The main grooves 53 are respectively disposed on the casing body short sides 31. Each main groove 53 is formed in the casing body inner peripheral surface 34. The casing body rear peripheral edge surface 35 is formed with two casing body protrusions 55 each of which is immediately adjacent to a respective one of the main grooves 53. After the frame 4 is assembled to the casing body 3, the second protrusions 52 are respectively received in the main grooves 53, each casing body protrusion 55 is engaged with the engaging groove 54 defined by each first protrusion 51 and the respective second protrusion 52, and each first protrusion 51 abuts against the casing body rear peripheral edge surface 35.

Figure 6:
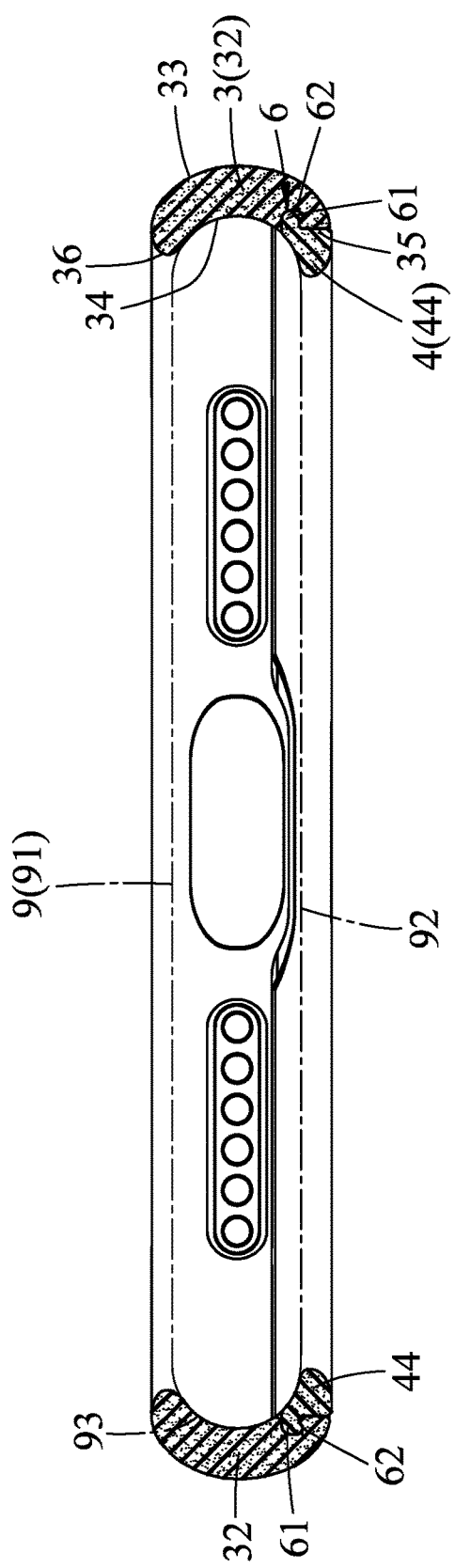
FIG. 6 is a sectional view taken along line VI-VI of FIG. 2.
Figure 7:
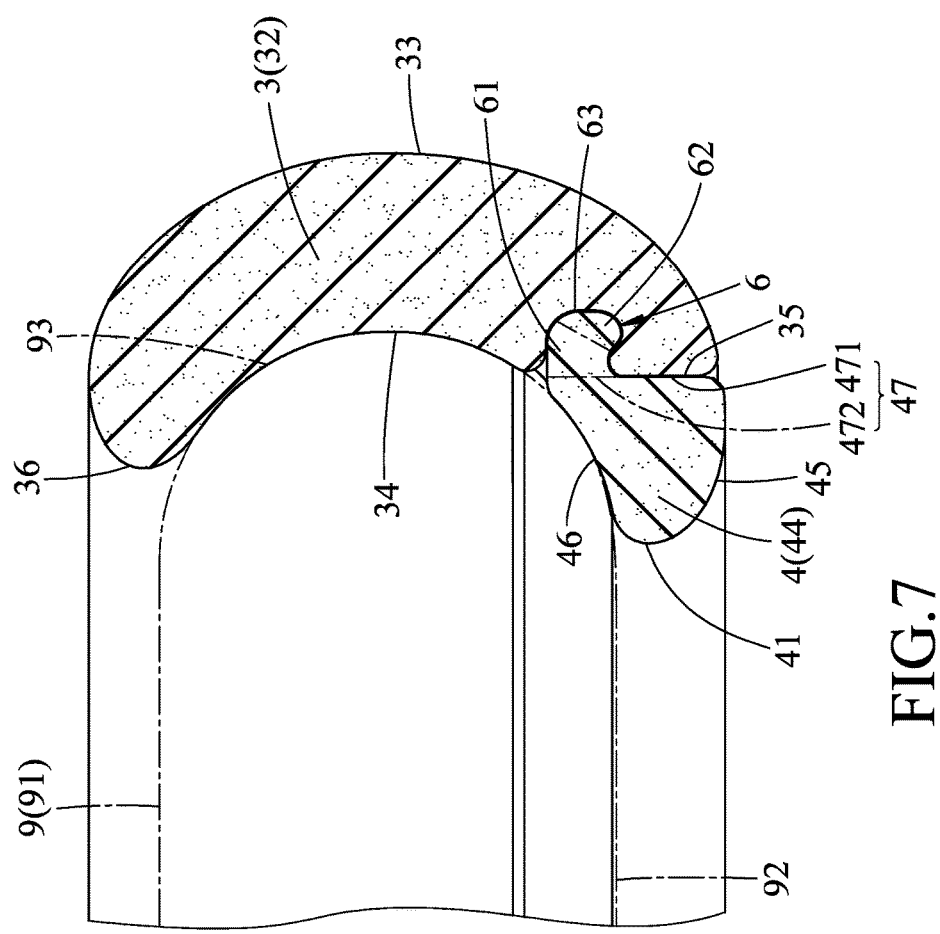
FIG. 7 is an enlarged fragmentary sectional view of FIG. 6.

With reference to FIGS. 2, 6 and 7, the engaging unit 6 includes two first projections 61, two second projections 62 and two retaining grooves 63. The first projections 61 are disposed on the frame long sides 44. Each first projection 61 extends outwardly from the second outer peripheral surface portion 472 of the frame outer peripheral surface 47 toward the casing body outer peripheral surface 33, and has a length extending in the top-bottom direction. Each second projection 62 extends outwardly and curvedly from a respective one of the first projections 61 toward the casing body rear peripheral edge surface 35. Each first projection 61 cooperates with a respective one of the second projections 62 to form a hook-like structure. The retaining grooves 63 are respectively disposed on the casing body long sides 32. Each retaining groove 63 is formed in the casing body rear peripheral edge surface 35 in proximity to the casing body inner peripheral surface 34, and has a shape conforming to the hook-like structure formed by each first projection 61 and the respective second projection 62 for engagingly receiving the same. The first outer peripheral surface portion 471 of the frame outer peripheral surface 47 abuts against the casing body rear peripheral edge surface 35 after the frame 4 is assembled to the casing body 3.

In this embodiment, the frame short sides 43 are respectively connected to the casing body short sides 31 through the coupling unit 5, and the frame long sides 44 are respectively connected to the casing body long sides 32 through the engaging unit 6, but is not limited thereto.

Figure 8:
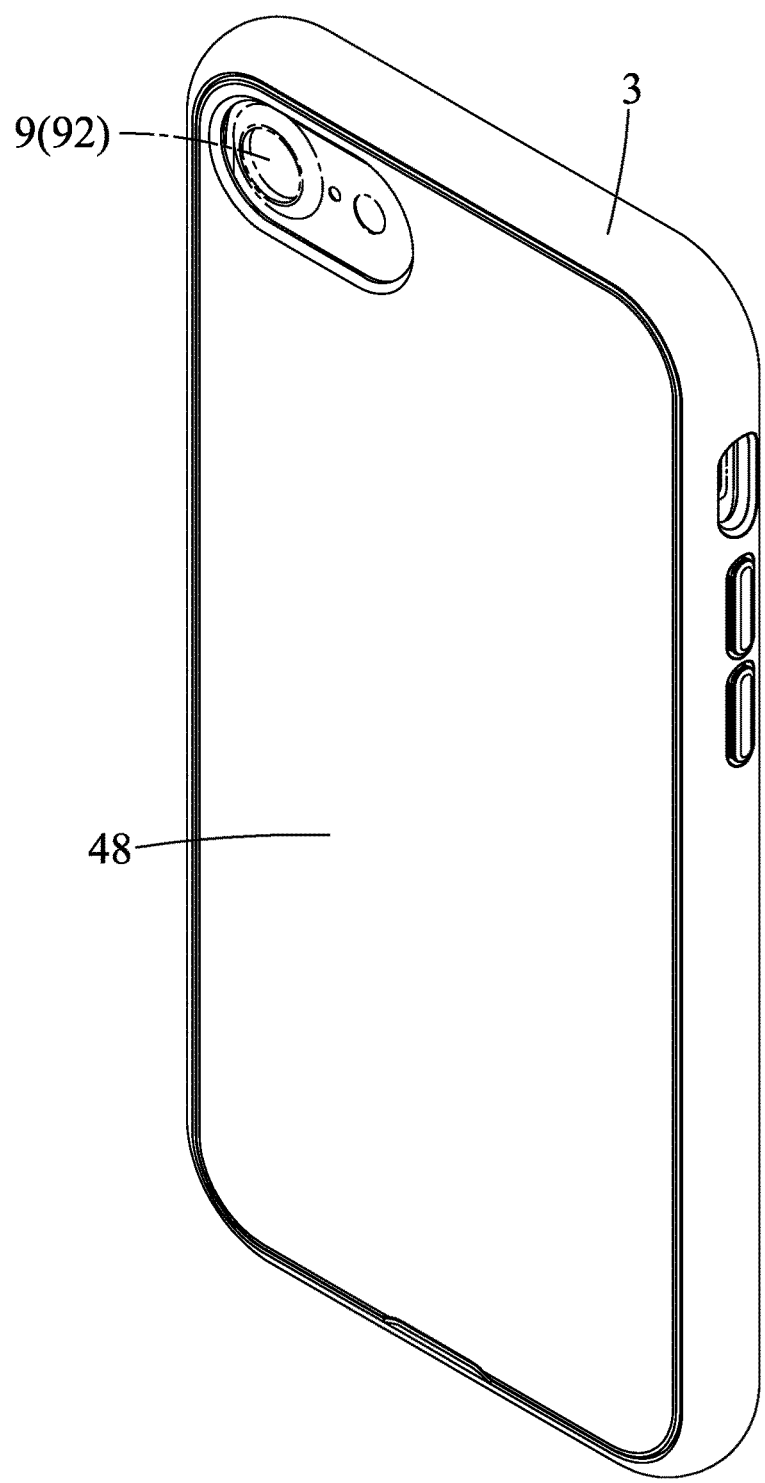
FIG. 8 is a view similar to FIG. 2, but illustrating an alternative form of the first embodiment.
Figure 9:
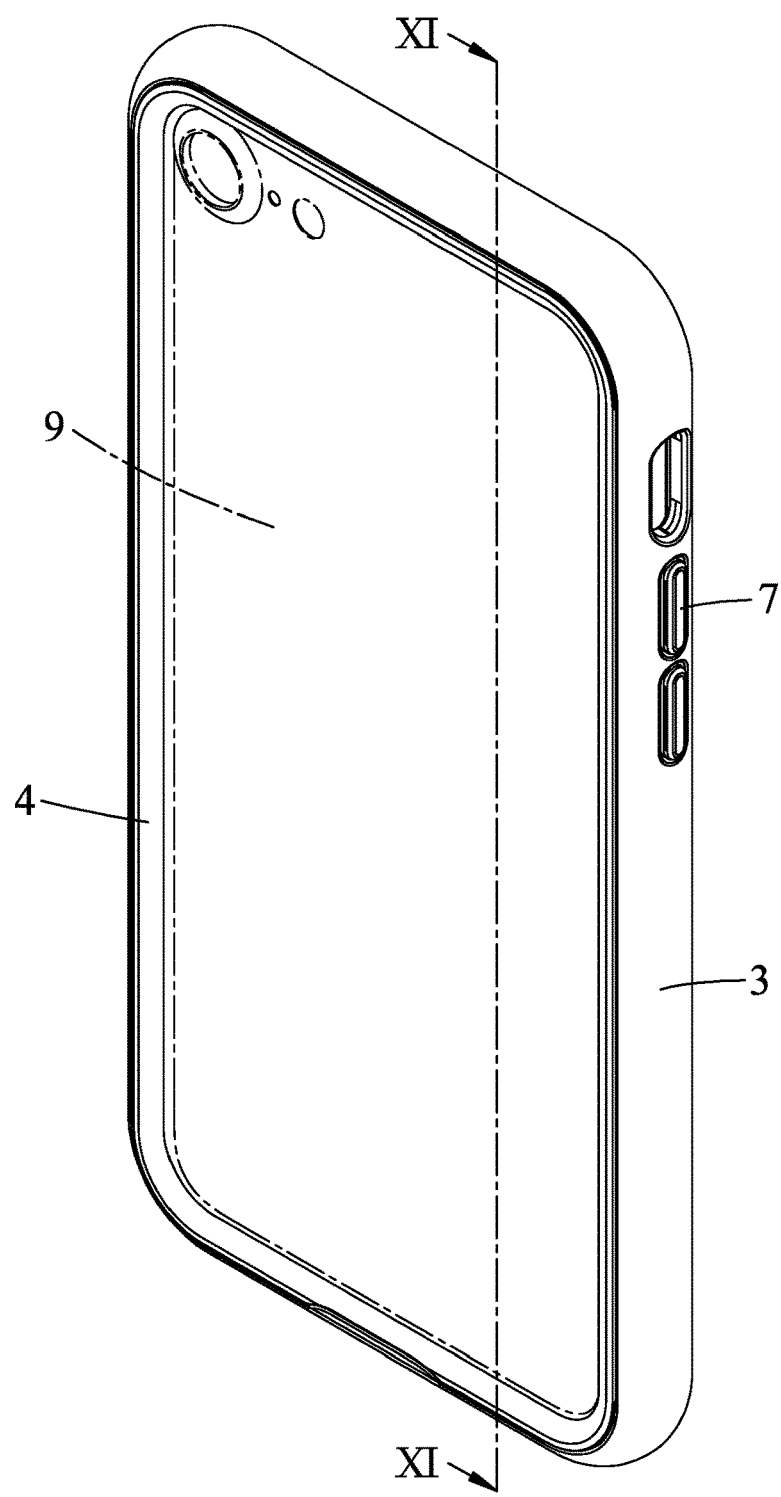
FIG. 9 is a perspective view of a protective case assembly according to the second embodiment of this disclosure.

It is worth to mention herein that, when a user intends to enhance the protection of the handheld device 9 or change the appearance thereof, the frame 4 can be removed from the casing body 3 and a back cover 48 is attached to the casing body 3, as shown in FIG. 8.

From the foregoing, the advantages of this disclosure can be summarized as follows:

The frame 4 of this disclosure is annular and is detachably coupled to the casing body 3. In comparison with the conventional protective case assembly which must sacrifice the design of the handheld device in order to achieve the protection thereof, apart from achieving protection of the handheld device 9, the protective case assembly of this disclosure can also allow complete exposure of the device back surface 92 of the handheld device 9 through the central hollow portion 42 of the frame body 40. Further, because the coupling unit 5 and the engaging unit 6 are located between the casing body 3 and the frame 4 and are hidden, an overall appearance of the protective case assembly of this disclosure can be enhanced.

The frame short sides 43 are respectively connected to the casing body short sides 31 through the coupling unit 5, and the frame long sides 44 are respectively connected to the casing body long sides 32 through the engaging unit 6. In comparison with the conventional protective case assembly, the protective case assembly of this disclosure employs two different coupling methods between the casing body 3 and the frame 4 to enhance the stability and coupling strength therebetween, so that the frame 4 will not easily detach from the casing body 3.

The frame 4 can be arbitrarily replaced by the back cover 48. In comparison with the conventional protective case assembly, the protective case assembly of this disclosure can allow the user to appropriately adjust the scope of protection of the handheld device 9 according to the environment where it will be used.

Referring to FIGS. 9 to 18, the second embodiment of the protective case assembly according to the present disclosure is shown to be generally identical to the first embodiment. However, in the second embodiment, the protective case assembly further comprises a button unit 7 and a limiting unit 8. Further, only the coupling unit 5' is used to couple the casing body 3 and the frame 4.

Figure 10:
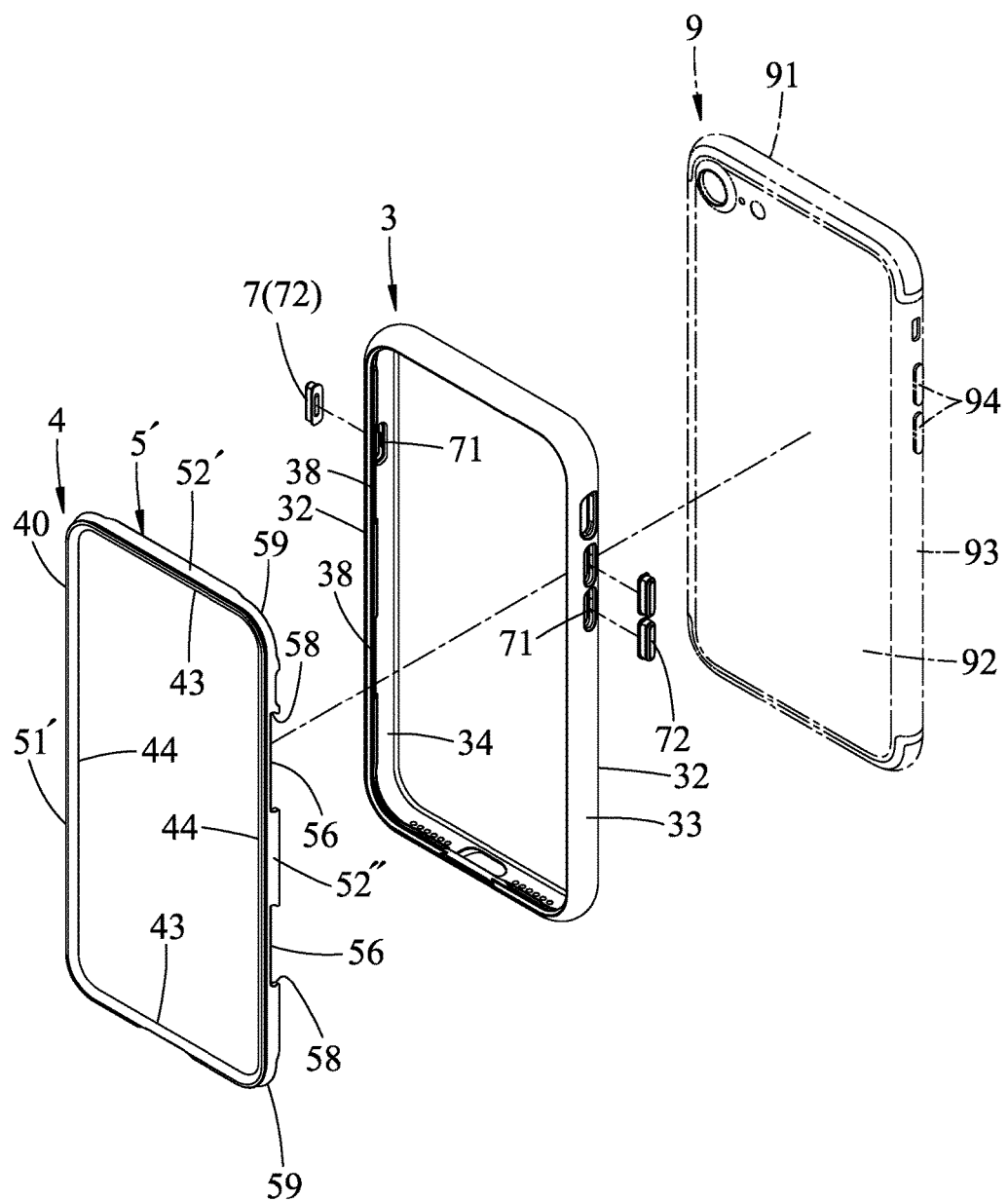
FIG. 10 is an exploded perspective view of the second embodiment.
Figure 12:
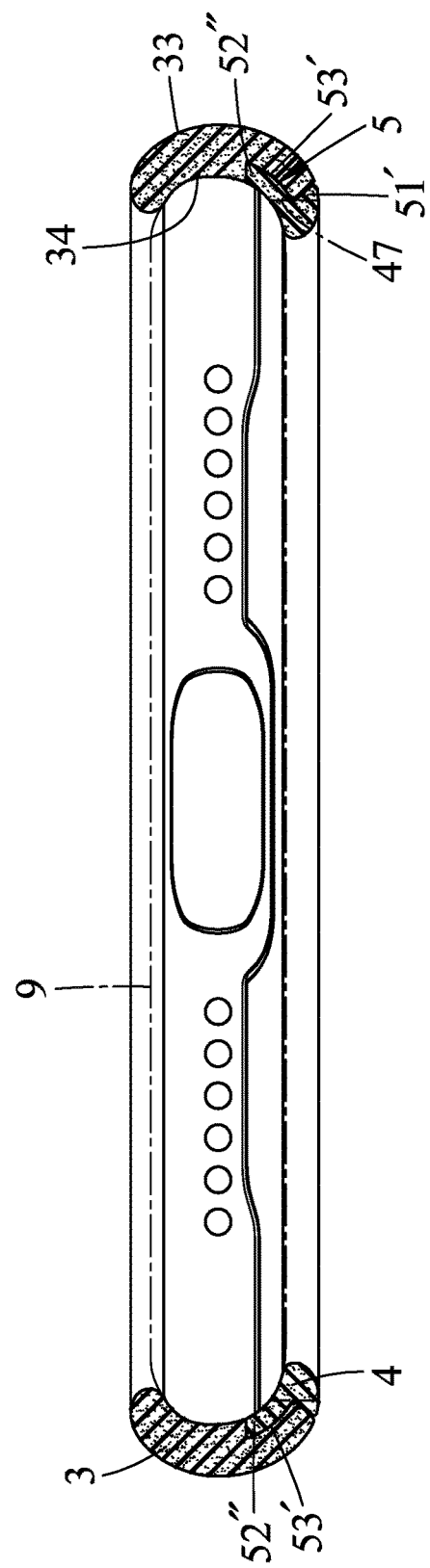
FIG. 12 is a sectional view taken along line XII-XII of FIG. 11.
Figure 14:
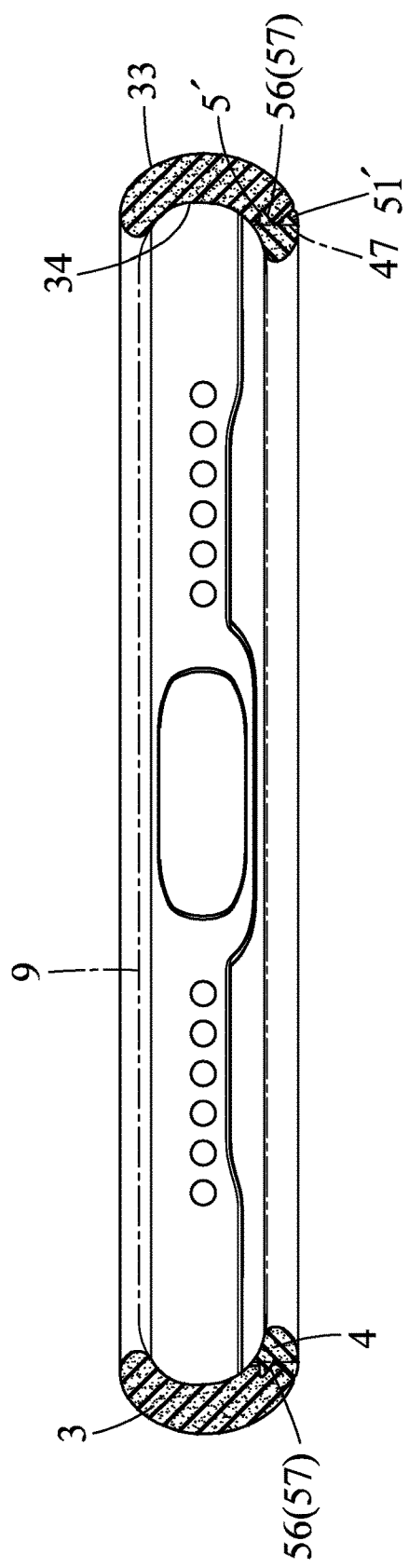
FIG. 14 is a sectional view taken along line XIV-XIV of FIG. 11.

With reference to FIGS. 10, 12 and 14, the coupling unit 5' includes a single first protrusion 51', four second protrusions 52', 52", four third protrusions 56, a single main groove 53', and four auxiliary grooves 57. The single first protrusion 51' is annular, and extends outwardly from the first outer peripheral surface portion 471 of the frame outer peripheral surface 47 toward the casing body 3. Two second protrusions 52' are disposed on the frame short sides 43, and respectively have a substantially U-shape. The other two second protrusions 52" are disposed on the frame long sides 44. Each second protrusion 52" has a length extending in the top-bottom direction. Each second protrusion 52', 52" extends outwardly from the second outer peripheral surface portion 472 of the frame outer peripheral surface 47 toward the casing body 3. The first protrusion 51' cooperates with a corresponding one of the second protrusions 52', 52" to define therebetween an engaging groove 54'. The single main groove 53' is annular, and is formed in the casing body inner peripheral surface 34 for receiving the second protrusions 52', 52".

Each two of the third protrusions 56 are disposed on a corresponding one of the frame long sides 44, and are spaced apart from each other in the top-bottom direction. Each third protrusion 56 extends outwardly from the second outer peripheral surface portion 472 of the frame outer peripheral surface 47, and cooperates with the first protrusion 51' to define therebetween an engaging groove 561. Each third protrusion 56 is located between one of the second protrusions 52' and a corresponding one of the second protrusions 52", such that each second protrusion 52" is flanked by two of the third protrusions 56 disposed on the same side thereof.

Figure 11:
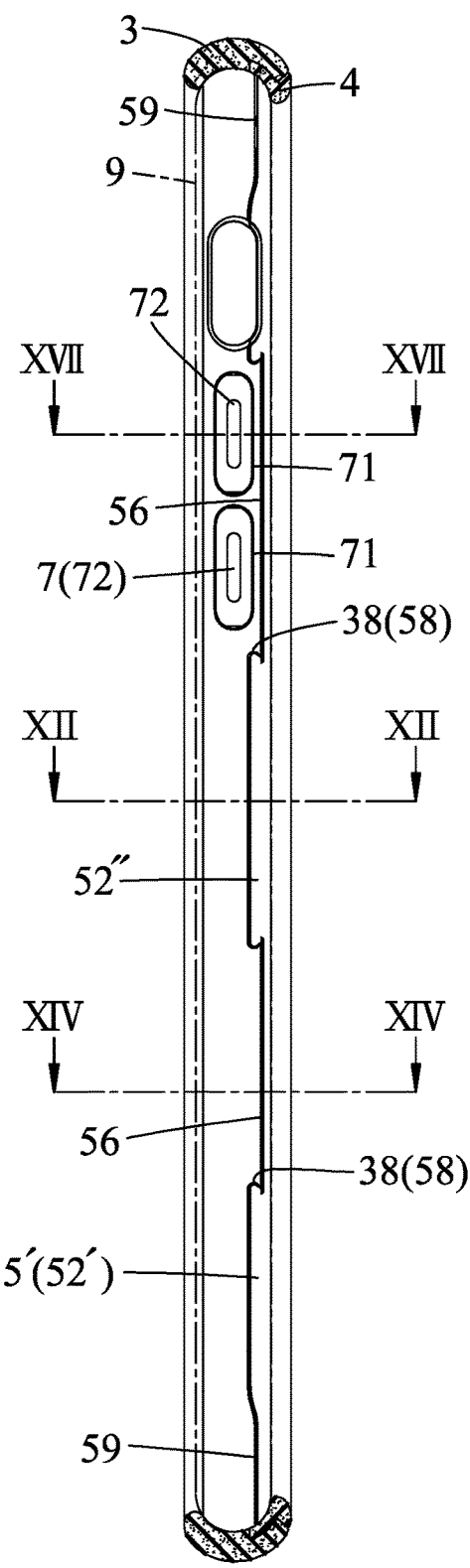
FIG. 11 is a sectional view taken along line XI-XI of FIG. 9.
Figure 13:
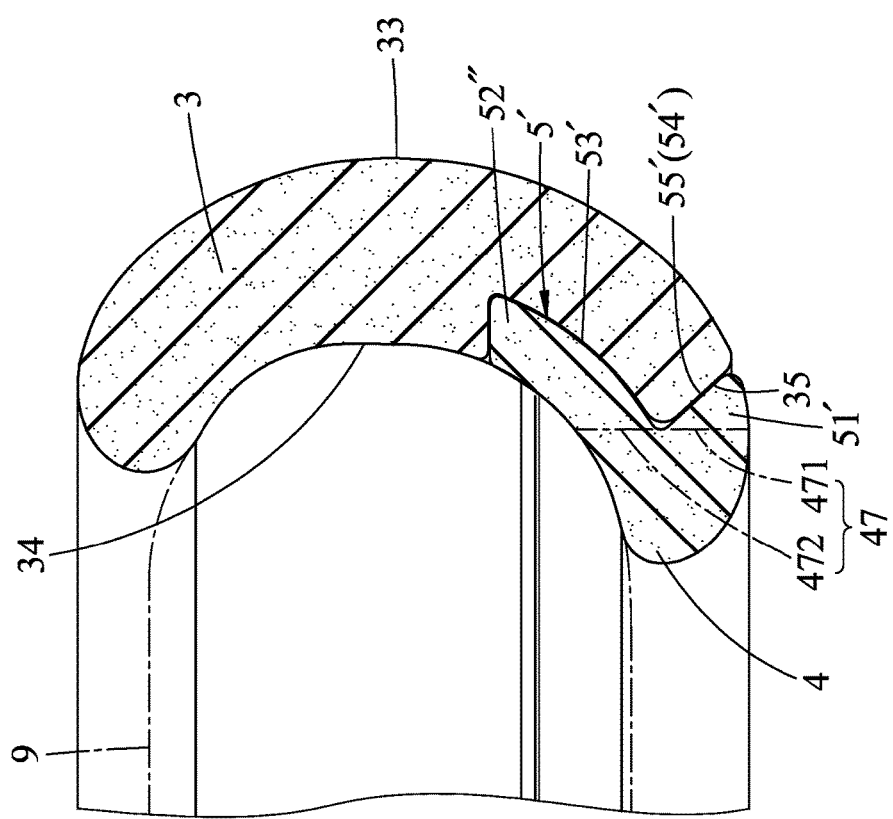
FIG. 13 is an enlarged fragmentary sectional view of FIG. 12.
Figure 15:
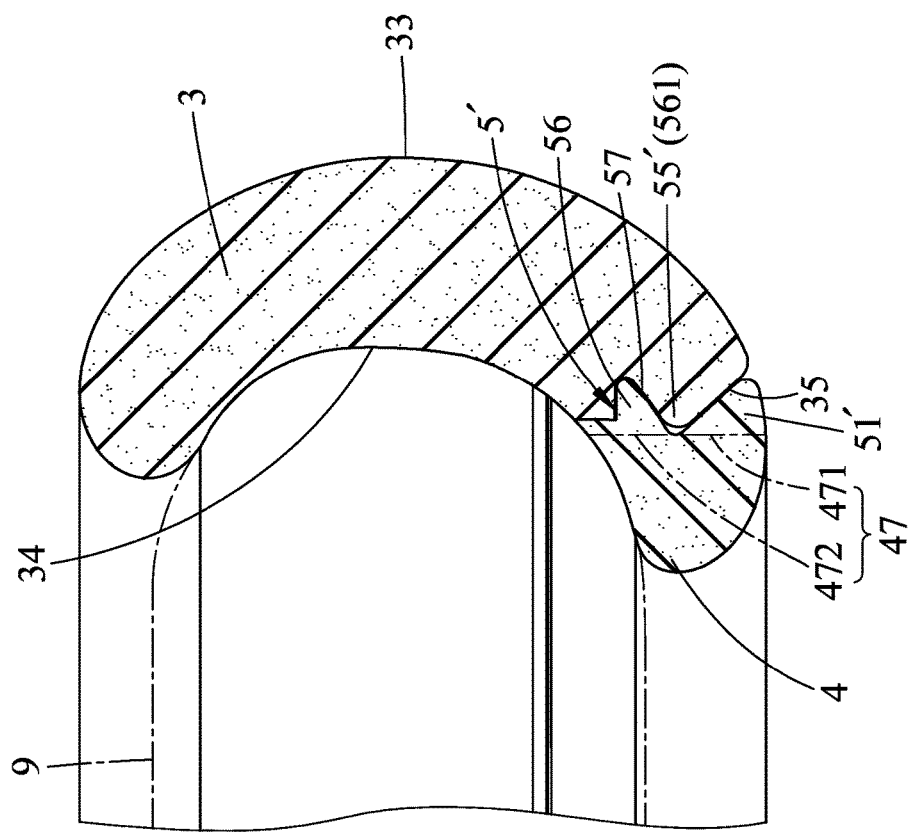
FIG. 15 is an enlarged fragmentary sectional view of FIG. 14.

With reference to FIGS. 11, 13 and 15, a length of each second protrusion 52', 52" extending from the frame outer peripheral surface 472 is longer than a length of each third protrusion 56 extending from the same. Each third protrusion 56 cooperates with one of the second protrusions 52' and the corresponding second protrusion 52" to define a dovetail groove 58.

The casing body rear peripheral edge surface 35 is formed with a single casing body protrusion 55' that is annular and that is immediately adjacent to the main groove 53'. The casing body inner peripheral surface 34 has two dovetail protrusions 38 formed on each of the casing body long sides 32 and spaced apart from each other in the top-bottom direction. The dovetail protrusions 38 are located inwardly of the casing body protrusion 55'.

Each two of the auxiliary grooves 57 are disposed on a corresponding one of the casing body long sides 32, and are formed in the casing body inner peripheral surface 34.

In this embodiment, each second protrusion 52' is formed with two chamfered edges 59 (only one chamfered edge 59 is visible in FIG. 10) each of which is located at a junction of one of the frame short sides 43 and a corresponding one of the frame long sides 44. That is, four corners of the frame body 40 are chamfered to facilitate connection of the frame 4 with the casing body 3.

After the frame 4 is coupled to the casing body 3, each of the second protrusions 52', 52" is received in the main groove 53', each third protrusion 56 is engaged with a respective one of the auxiliary grooves 57, each dovetail protrusion 38 is engaged with the dovetail groove 58 defined by each third protrusion 56 with one of the second protrusions 52' and the corresponding second protrusion 52", and the first protrusion 51' abuts against the casing body rear peripheral edge surface 35. Further, the casing body protrusion 55' is engaged with the engaging groove 54' defined by the first protrusion 51' and the corresponding second protrusion 52', 52" and with the engaging groove 561 defined by the first protrusion 51' and the corresponding third protrusion 56.

Figure 16:
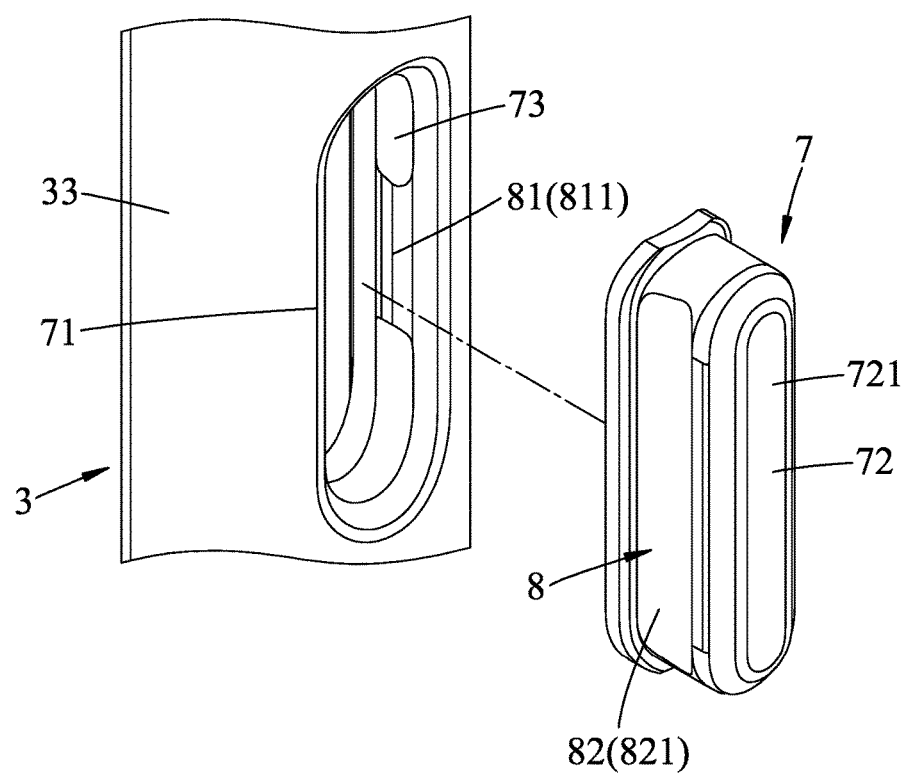
FIG. 16 is an enlarged perspective view of a button unit and a limiting unit the second embodiment.
Figure 17:
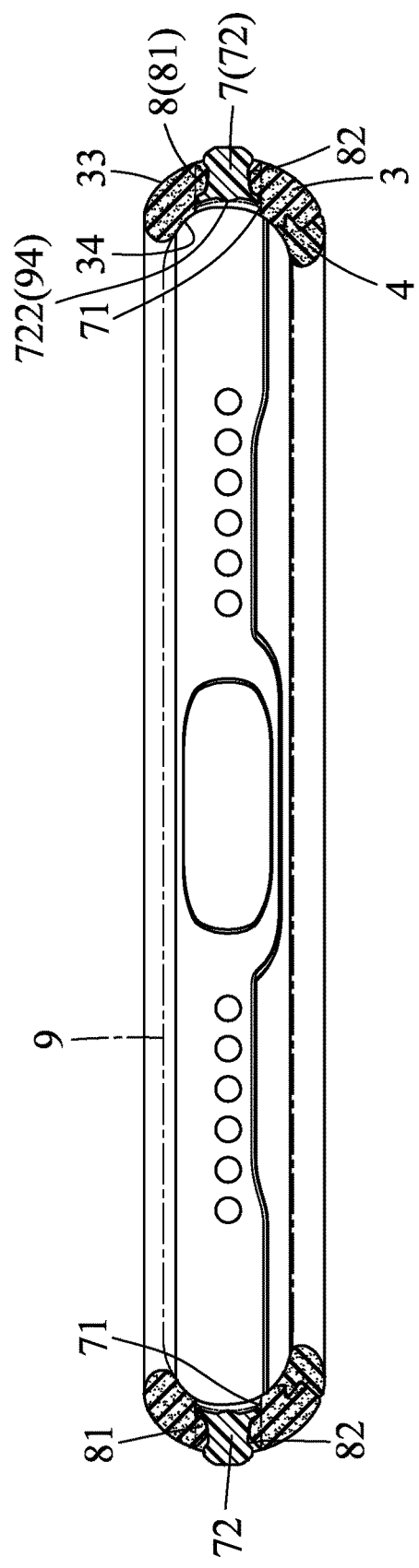
FIG. 17 is a sectional view taken along line XVII-XVII of FIG. 11.

With reference to FIGS. 10, 16 and 17, the button unit 7 includes three button holes 71 extending through the casing body outer and inner peripheral surfaces 33, 34 and corresponding in position to push buttons 94 of the handheld device 9, and three pressing members 72 disposed removably and respectively in the button holes 71. Each button hole 71 is defined by a hole-defining wall 73 that extends between and that terminates at the casing body outer and inner peripheral surfaces 34, 33. Two of the button holes 71 are located on one of the casing body long sides 32, while a third one of the button holes 71 is located on the other casing body long side 32. Each pressing member 72 has a first surface 721 for a user to press thereon, and a second surface 722 opposite to the first surface 721 for contacting a respective one of the push buttons 94 of the handheld device 9.

Figure 18:
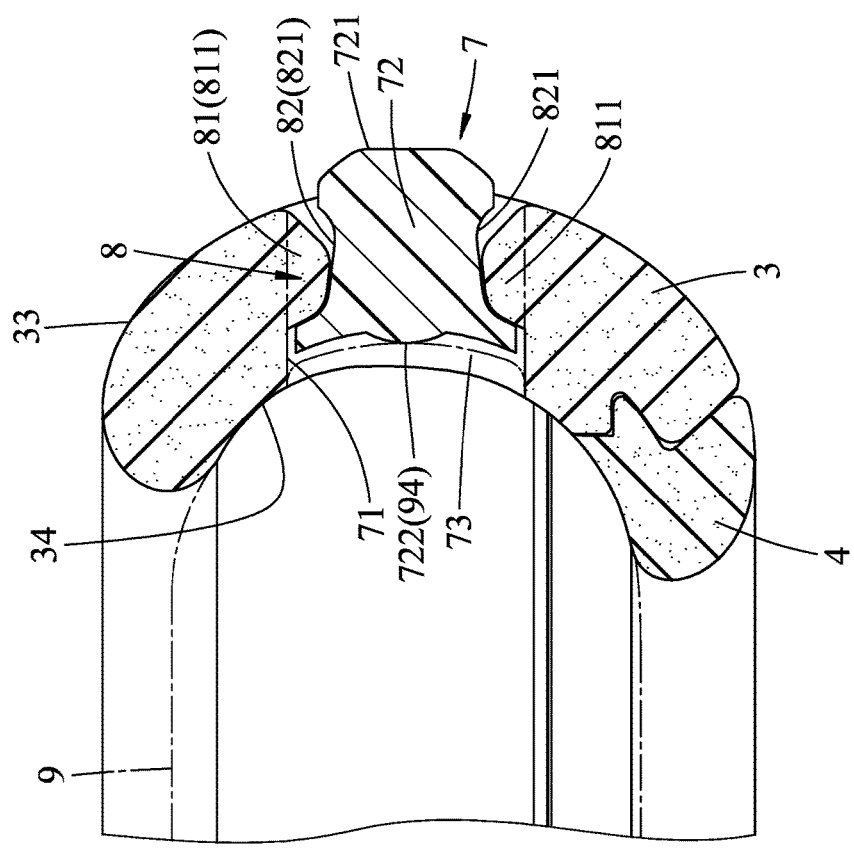
FIG. 18 is an enlarged fragmentary sectional view of FIG. 17.

With reference to FIGS. 16 to 18, the limiting unit 8 includes three bump groups 81 respectively provided on the hole-defining walls 73 of the button holes 71, and three limiting groove groups 82 respectively provided on the pressing members 72. Each of the bump groups 81 includes two limiting bumps 811 extending from a corresponding one of the hole-defining walls 73 toward each other. Each of the limiting groove groups 82 includes two limiting grooves 821 formed on two opposite sides of a corresponding one of the pressing members 72 for receiving slidingly and respectively the two limiting bumps 811.

Apart from achieving the same advantages as those of the first embodiment, the second embodiment utilizes the addition of the dovetail engaging structure to the original engaging method of the casing body protrusion 55' with the engaging groove 54' defined by the first protrusion 51' and the corresponding second protrusion 52', 52" and with the engaging groove 561 defined by the first protrusion 51' and the corresponding third protrusion 56, so that the coupling strength between the frame 4 and the casing body 3 can be enhanced, and the frame 4 cannot be easily detached from the casing body 3.

Furthermore, the second embodiment utilizes the pressing members 72 disposed removably and respectively in the button holes 71 and utilizes the limiting grooves 821 to permit the respective limiting bumps 811 to slidably engage therein, so that when each pressing member 72 is pressed by the user, each pressing member 72 can slide smoothly and will not easily detach from the respective button hole 71. Moreover, the removable design of the pressing members 72 can permit the user to change the color of each pressing member 72, thereby providing a customized combination.

In summary, the protective case assembly of this disclosure not only can maintain the aesthetic appearance of the handheld device 9 by completely exposing the device back surface 92 thereof, but also can allow the user to use the frame 4 or the back cover 48 according to the environment where it will be used. Hence, the object of this disclosure can indeed be achieved.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A protective case assembly for a handheld device which has a device front surface, a device back surface opposite to the device front surface, and a device peripheral surface connected between the device front surface and the device back surface, said protective case assembly comprising:
    a casing body configured to surround the device peripheral surface and having a casing body outer peripheral surface, and a casing body inner peripheral surface opposite to said casing body outer peripheral surface and configured to abut against the device peripheral surface;
    a button unit including a plurality of button holes extending through said casing body outer peripheral surface and said casing body inner peripheral surface, and a plurality of pressing members disposed removably and respectively in said button holes, each of said button holes being defined by a hole-defining wall that extends between and that terminates at said casing body outer peripheral surface and said casing body inner peripheral surface; and
    a limiting unit including a plurality of bump groups respectively provided on said hole-defining walls of said button holes, and a plurality of limiting groove groups respectively provided on said pressing members to permit slidable engagement of said bump groups therein.

2. The protective case assembly as claimed in claim 1, wherein each of said bump groups includes two limiting bumps extending from a corresponding one of said hole-defining walls toward each other, each of said limiting groove groups including two limiting grooves formed on two opposite sides of a corresponding one of said pressing members for receiving slidingly and respectively said two limiting bumps.

3. The protective case assembly as claimed in claim 1, further comprising a frame detachably connected to said casing body and having a frame inner peripheral surface that defines a central hollow portion for exposure of the device back surface.

4. The protective case assembly as claimed in claim 3, wherein:
    said casing body has a casing body outer peripheral surface, a casing body inner peripheral surface opposite to said casing body outer peripheral surface and configured to abut against the device peripheral surface, a casing body rear peripheral edge surface interconnecting rear edges of said casing body outer peripheral surface and said casing body inner peripheral surface and configured to be proximate to the device back surface, a casing body front peripheral edge surface interconnecting front edges of said the casing body outer peripheral surface and said casing body inner peripheral surface and opposite to said casing body rear peripheral edge surface, two spaced-apart casing body short sides, and two spaced-apart casing body long sides connected between said casing body short sides; and
    said frame further has a frame outer peripheral surface opposite to said frame inner peripheral surface, a frame rear peripheral edge surface interconnecting rear edges of said frame inner peripheral surface and said frame outer peripheral surface, a frame front peripheral edge surface interconnecting front edges of said frame inner peripheral surface and said frame outer peripheral surface and opposite to said frame rear peripheral edge surface, two spaced-apart frame short sides corresponding to said casing body short sides, and two spaced-apart frame long sides connected between the frame short sides and corresponding to said casing body long sides, said frame front peripheral edge surface being configured to abut against the device peripheral surface, said frame outer peripheral surface having a first outer peripheral surface portion connected to said frame rear peripheral edge surface, and a second outer peripheral surface portion connected to said frame front peripheral edge surface and said first outer peripheral surface portion.

5. The protective case assembly as claimed in claim 4, further comprising a coupling unit detachably coupling said frame to said casing body and including at least one first protrusion extending outwardly from said first outer peripheral surface portion of said frame outer peripheral surface and abutting against said casing body rear peripheral edge surface, at least two spaced-apart second protrusions extending outwardly from said second outer peripheral surface portion of said frame outer peripheral surface toward said casing body, and at least one main groove formed in said casing body inner peripheral surface, said at least one first protrusion cooperating with a corresponding one of said second protrusions to define therebetween an engaging groove, said at least two second protrusions being received in said at least one main groove, said casing body rear peripheral edge surface being formed with at least one casing body protrusion immediately adjacent to said at least one main groove and engaged with said engaging groove.

6. The protective case assembly as claimed in claim 5, further comprising an engaging unit detachably engaging said frame to said casing body and including two first projections disposed on said frame long sides and each of which extends outwardly from said second outer peripheral surface portion of said frame outer peripheral surface toward said casing body outer peripheral surface, two second projections each of which extends outwardly and curvedly from a respective one of said first projections toward said casing body rear peripheral edge surface, and two retaining grooves disposed on said casing body long sides, each of said retaining grooves being formed in said casing body rear peripheral edge surface in proximity to said casing body inner peripheral surface, each of said first projections cooperating with a respective one of said second projections to form a hook-like structure, each of said retaining grooves having a shape conforming to said hook-like structure for engagingly receiving said hook-like structure, said frame short sides being respectively connected to said casing body short sides through said coupling unit, said frame long sides being respectively connected to said casing body long sides through said engaging unit.

7. The protective case assembly as claimed in claim 6, wherein:

said at least one first protrusion includes two first protrusions disposed on said frame short sides;
said at least two second protrusions are disposed on said frame short sides;
each of said first protrusions cooperates with a respective one of said second protrusions to define therebetween said engaging groove;
said at least one main groove includes two main grooves disposed on said casing body short sides for receiving said at least two second protrusions, respectively; and
said casing body rear peripheral edge surface is formed with two casing body protrusions each of which is immediately adjacent to a respective one of said main grooves and is engaged with said engaging groove.

8. The protective case assembly as claimed in claim 5, wherein:
said at least one first protrusion includes a single first protrusion that is annular and that extends outwardly from said first outer peripheral surface portion of said frame outer peripheral surface toward said casing body;
said at least two second protrusions includes four second protrusions, two of which are disposed on said frame short sides and the other two of which are disposed on said frame long sides, each of said second protrusions cooperating with said at least one first protrusion to define therebetween said engaging groove;
said at least one main groove includes a single main groove that is annular and that is formed in said casing body inner peripheral surface for receiving said second protrusions;
said coupling unit further includes four third protrusions each two of which are disposed on a corresponding one of said frame long sides and extend outwardly from said second outer peripheral surface portion of said frame outer peripheral surface, and four auxiliary grooves each two of which are disposed on a corresponding one of said casing body long sides and formed in said casing body inner peripheral surface, each of said third protrusions being received in a respective one of said auxiliary grooves;
each of said third protrusions cooperates with said at least one first protrusion to define therebetween an engaging groove; and
said at least one casing body protrusion is a single casing body protrusion that is annular and that is engaged with said engaging groove defined by said at least one first protrusion and a corresponding one of said second protrusions and with said engaging groove defined by said at least one first protrusion and a corresponding one of said third protrusions.

9. The protective case assembly as claimed in claim 8, wherein:
each of said second protrusions disposed on a corresponding one of said frame long sides is flanked by two of said third protrusions disposed on the same side thereof;
a length of each of said second protrusions extending from said frame outer peripheral surface is longer than a length of each of said third protrusions extending from said frame outer peripheral edge surface;
said casing body inner peripheral surface has at least two dovetail protrusions formed on each of said casing body long sides; and
each of said third protrusions cooperates with one of said second protrusions disposed on one of said frame short sides and a corresponding one of said second protrusions disposed on one of said frame long sides to define a dovetail groove for engagingly receiving a corresponding one of said at least two dovetail protrusions.

10. The protective case assembly as claimed in claim 4, further comprising an engaging unit detachably engaging said frame to said casing body and including two first projections disposed on said frame long sides and each of which extends outwardly from said second outer peripheral surface portion of said frame outer peripheral surface toward said casing body outer peripheral surface, two second projections each of which extends outwardly and curvedly from a respective one of said first projections toward said casing body rear peripheral edge surface, and two retaining grooves disposed on said casing body long sides, each of said retaining grooves being formed in said casing body rear peripheral edge surface in proximity to said casing body inner peripheral surface, each of said first projections cooperating with a respective one of said second projections to form a hook-like structure, each of said retaining grooves having a shape conforming to said hook-like structure for engagingly receiving said hook-like structure.

\* \* \* \* \*